United States Patent [19]

Meek

[11] 4,076,347

[45] Feb. 28, 1978

[54] ANTIFRICTION NYLON MEMBER

[75] Inventor: Lennis E. Meek, Portage, Mich.

[73] Assignee: Dayco Corporation, Dayton, Ohio

[21] Appl. No.: 707,451

[22] Filed: Jul. 21, 1976

[51] Int. Cl.$^2$ .................... F16C 33/16; F16C 33/20

[52] U.S. Cl. .................................. 308/238; 308/240; 308/241; 308/243

[58] Field of Search ......... 308/240, 241, 243, DIG. 8, 308/DIG. 7, DIG. 9, 238

[56] References Cited

U.S. PATENT DOCUMENTS

| | | | |
|---|---|---|---|
| 2,995,405 | 8/1961 | Ferdig | 308/DIG. 7 |
| 3,011,219 | 12/1961 | Williams | 308/DIG. 7 |
| 3,101,961 | 8/1963 | White | 308/DIG. 7 |
| 3,107,949 | 10/1963 | Moskovitz | 308/DIG. 7 |
| 3,125,004 | 3/1964 | White | 308/DIG. 7 |
| 3,135,564 | 6/1964 | Agens | 308/DIG. 7 |
| 3,177,020 | 4/1965 | Dumpis | 308/DIG. 7 |
| 3,214,375 | 10/1965 | Berkeley | 308/243 |

*Primary Examiner*—Richard A. Bertsch

*Attorney, Agent, or Firm*—Reuben Wolk

[57] ABSTRACT

An antifriction nylon member is provided which is comprised of a lubricant, a surfactant, and nylon wherein the lubricant is substantially uniformly dispersed throughout the nylon by the surfactant.

13 Claims, No Drawings

ANTIFRICTION NYLON MEMBER

BACKGROUND OF THE INVENTION

Nylon has a number of desirable properties which have resulted in its wide use in making antifriction members such as bearing members, for example. However, nylon has a coefficient of friction which is sufficiently high that it is desirable to provide lubrication at the interface of the nylon with an associated component coming into sliding contact thereagainst. In many applications it is impractical or undesirable to inject or provide a lubricant from an external source to such interface whereby numerous attempts have been made previously to permanently lubricate nylon members, such as nylon bearing members, by providing lubricant as an integral part of the nylon matrix.

Some of the above-mentioned previous attempts for dispersing a lubricant within a nylon matrix have resulted in substantially reducing the structural integrity of the nylon because porous nylon was employed. Another of such previous attempts, presented in the U.S. Pat. No. 3,414,516, utilizes a so-called sorbent which is mixed with a lubricant and dispersed in the nylon; however, the technique proposed by this patent does not assure efficient provision of the lubricant at the surface of the nylon where it comes into sliding contact with an associated component.

Accordingly, it is apparent that the need exists for a nonporous antifriction nylon member which has a lubricant dispersed therethrough and wherein such lubricant is available at the surface thereof which is to be in sliding contact with another component.

The term nylon is used generically in this disclosure to designate a long-chain synthetic polymeric amide with recurring amide groups as an integral part of the polymer chain.

SUMMARY

It is a feature of this invention to provide an antifriction nylon member which has a lubricant substantially uniformly dispersed throughout by a surfactant wherein the surfactant also assures provision of the lubricant to the outside surface of the nylon member where it is brought into sliding contact with another component.

Another feature of this invention is the provision of an antifriction nylon member of the character mentioned wherein the lubricant which is uniformly dispersed therethrough is a liquid lubricant.

Another feature of this invention is the provision of an antifriction nylon member of the character mentioned which is particularly adapted to be used as a bearing member.

Another feature of this invention is the provision of an antifriction member of the character mentioned which also has solid finely divided constituents dispersed uniformly therethrough by the surfactant.

Another feature of this invention is the provision of a method of making an antifriction nylon member.

Therefore, it is an object of this invention to provide an improved antifriction nylon member, and method of making same, having one or more of the novel features set forth above or hereinafter described.

Other objects, features, details, uses and advantages of this invention will be readily apparent from the embodiments thereof presented in the following specification and claims.

DETAILED DESCRIPTION

The antifriction member of this invention is primarily a nylon member, such as a bearing member, which has a lubricant dispersed therethrough in a substantially uniform manner by the utilization of a surfactant, and additional constituents may also be provided in the nylon together with the lubricant and surfactant as will be presented hereinafter.

The lubricant is preferably in the form of a liquid lubricant and may be in the form of a natural or synthetic base lubricating oil or a mineral oil. An example of a paraffin-base lubricating oil which may be used is sold by the Exxon Oil Company of New Jersey under the trade designation of Nuto No. 63. An example of mineral oil which may be used is sold by the Exxon Oil Company of New Jersey under the trade designation of Exxon Primol 355 Mineral Oil.

The amount of liquid lubricant, such as lubricating oil, which is used may vary from 4 to 10 parts by weight of the total weight of the nylon member, including all of its constituents; and, the nylon member may have from 0.10 to 0.20 parts by weight of a surfactant provided therein with the balance being primarily nylon matrix. The lubricant is substantially uniformly dispersed throughout the nylon matrix or nylon by the utilization of the surfactant.

In addition to the liquid lubricant and the surfactant, the antifriction nylon member may also have graphite dispersed throughout the nylon matrix; and, the graphite may comprise from 0.75 to 1.00 parts by weight of the total weight of the nylon member.

The antifriction nylon member of this invention comprised of nylon, from 4 to 10 parts by weight of liquid lubricant, and from 0.75 to 1.00 parts by weight of graphite may also comprise from 0.25 – 0.30 parts by weight of lithium stearate.

The antifriction nylon of this invention comprised of nylon from 4 to 10 parts by weight of lubricant, and from 0.10 to 0.20 parts by weight of surfactant, may also have from 5 to 10 parts by weight of tetrafluoroethylene.

It will be appreciated that the graphite, lithium stearate, and tetrafluoroethylene may be of any suitable commercial grade available in the art. For example, graphite processed by the Union Carbide Company of New York and sold under the trade designation of Union Carbide Graphite GP-38 may be used.

The antifriction nylon member of this invention may be utilized in any suitable application where it is disposed in sliding contact with another component; and, has particular application as a bearing member.

The nylon member of this invention may be made employing method steps now to be described. In particular, from 35 to 48 parts by weight of molten nylon are provided in a first container with a suitable known catalyst and heated to a temperature of roughly 120° C. From 35 to 48 parts by weight of molten nylon are provided in a second container with a suitable promoter; from 4 to 10 parts by weight of a lubricant, preferably a liquid lubricant; and from 0.10 to 0.20 parts by weight of a surfactant and these constituents are heated to a temperature of roughly 120° C and mixed in what will be considered a mixing step to form a smooth substantially homogeneous mixture. The mixture thus defined in the second container is then blended with the molten nylon and catalyst in the first container in a suitable blender until polymerization is completed to define a blend thereof whereby the lubricant is substantially uniformly dispersed throughout the molten nylon by the surfactant. The blend is disposed in a suitable commercially available mold means and cooled below the solidification temperature of the molten nylon to define the nylon member of this invention having the lubricant substantially uniformly dispersed throughout by the surfactant.

The above-described blending is achieved at the usual temperature at which nylon is provided in a molten state and is preferably achieved at roughly 120° C and the blending is achieved in a thorough manner to define a homogeneous blend of molten nylon and the above-mentioned constituents. Further, of the two common grades of nylon which may be used, E-caprolactum is preferred and in the final blend comprises from 70 to 96 parts of the total weight thereof.

The blend thus defined is then disposed in a mold preferably by pouring from the blending container using gravity feed or may be centrifugally cast and allowed to polymerize and cool. The cooling may be achieved using ambient air to provide the cooling function and suitable air circulation means may be employed. The nylon member thus defined may be considered as a cast nylon member and once cooled is easily removed from its mold because the lubricant also serves as a mold release agent.

It will be appreciated that the antifriction nylon member of this invention may be comprised of additional constituents, such as graphite, lithium stearate, and tetrafluoroethylene, for example. These constituents when employed are preferably mixed with the liquid lubricant and surfactant during the above-described mixing step to define a resulting mixture and such mixture is then blended with the molten nylon and catalyst.

Any commercially available grade of graphite and lithium stearate may be employed. When graphite is employed it should be of a particle size less than 105 microns with 96% passing through a No. 140 standard sieve and the graphite has a 98% minimum amount of fixed carbon. When lithium stearate is employed it should be such that it has a melting point ranging between 205° C – 215° C and be of a particle size less than 74 microns with 99% passing through a No. 200 standard sieve.

Having described the antifriction nylon member of this invention and method of making the same in which certain ranges of amounts of its constituents have been described, examples will now be presented of nylon members which have been made experimentally and in which the constituents of each member of each example are set forth in detail. It will also be noted that the compressive yield strength of each antifriction nylon member is also shown in each example.

| CONSTITUENT | PARTS BY WEIGHT | YIELD STRENGTH (psi) |
|---|---|---|
| Example I | | |
| Nylon | 93.89 | |
| Lubricating oil | 4.70 | |
| Graphite | 0.94 | 9850 |
| Lithium stearate | 0.28 | |
| Surfactant | 0.10 | |
| Example II | | |
| Nylon | 90.40 | |
| Lubricating oil | 9.40 | 8400 |
| Surfactant | 0.20 | |
| Example III | | |
| Nylon | 89.18 | |
| Lubricating oil | 9.40 | |
| Graphite | 0.94 | 7600 |
| Lithium stearate | 0.28 | |
| Surfactant | 0.20 | |
| Example IV | | |
| Nylon | 79.80 | |
| Lubricating oil | 10.00 | 5200 |
| Tetrafluoroethylene | 10.00 | |
| Surfactant | 0.20 | |

In this disclosure of the invention, reference has been made to the utilization of a surfactant in general terms. An example of a surfactant which has been satisfactorily employed is sold by the American Cyanamid Co. of New Jersey and sold under the trade designation Aerosol OT 100%.

It should be noted that tetrafluoroethylene was used in Example IV above. The specific material used in this example was manufactured by the Davies Nitrate Company, a subsidiary of Allied Chemical Corporation of New Jersey and sold under the trademark "Halon" as Fluorowax B.

While present exemplary embodiments of this invention, and methods of practicing the same, have been described, it will be recognized that this invention may be otherwise variously embodied and practiced within the scope of the following claims.

What is claimed is:

1. An antifriction nylon member comprising, from 4 to 10 parts by weight of a lubricant, from 0.10 to 0.20 parts by weight of a surfactant, and the balance of nylon, said lubricant being substantially uniformly dispersed throughout said nylon by said surfactant.

2. A member as set forth in claim 1 and further comprising from 5 to 10 parts by weight of tetrafluoroethylene.

3. A member as set forth in claim 1 in which said lubricant is a lubricating oil.

4. A member asset forth in claim 1 in which said lubricant is a mineral oil.

5. A member as set forth in claim 1 in which said lubricant is a lubricating oil and further from 0.75 to 1.00 parts by weight of graphite, said graphite serving to enhance the lubricating properties of said lubricating oil.

6. A member as set forth in claim 5 and further comprising from 0.25 to 0.30 parts by weight of lithium stearate.

7. A member as set forth in claim 1 in the form of a cast bearing member.

8. A self-lubricated non-porous nylon bearing member comprising, from 4 to 10 parts by weight of a lubricant, from 0.10 to 0.20 parts by weight of a surfactant, and the balance of nylon, said lubricant being substantially uniformly dispersed throughout said nylon by said surfactant.

9. A bearing member as set forth in claim 8 in which said lubricant is a lubricating oil.

10. A bearing member as set forth in claim 9 and further comprising from 5 to 10 parts by weight of tetrafluoroethylene.

11. A bearing member as set forth in claim 8 in which siad lubricant is a mineral oil.

12. A bearing member as set forth in claim 8 in which said lubricant is a lubricating oil and further comprising from 0.75 to 1.00 parts by weight of graphite, said graphite serving to enhance the lubricating properties of said lubricating oil.

13. A bearing member as set forth in claim 12 and further comprising from 0.25 to 0.30 parts by weight of lithium stearate.

* * * * *